US011815875B2

(12) United States Patent
Geng et al.

(10) Patent No.: US 11,815,875 B2
(45) Date of Patent: Nov. 14, 2023

(54) METHODS, SYSTEMS, AND APPARATUSES OF PURGE CONTENT ESTIMATION LOGIC FOR IMPROVED FUEL CONTROL

(71) Applicant: GM GLOBAL TECHNOLOGY OPERATIONS LLC, Detroit, MI (US)

(72) Inventors: Jianyang Geng, South Lyon, MI (US); Scott R. Jeffrey, Hartland, MI (US); Steven W. Majors, Howell, MI (US); Jin Shen, Northville, MI (US)

(73) Assignee: GM GLOBAL TECHNOLOGY OPERATIONS, LLC, Detroit, MI (US)

( * ) Notice: Subject to any disclaimer, the term of this patent is extended or adjusted under 35 U.S.C. 154(b) by 649 days.

(21) Appl. No.: 17/038,615

(22) Filed: Sep. 30, 2020

(65) Prior Publication Data

US 2022/0100167 A1 Mar. 31, 2022

(51) Int. Cl.
*G05B 19/408* (2006.01)
*G06N 3/08* (2023.01)

(52) U.S. Cl.
CPC ............ *G05B 19/408* (2013.01); *G06N 3/08* (2013.01); *G05B 2219/45076* (2013.01)

(58) Field of Classification Search
CPC ........ G05B 19/408; G05B 2219/45075; G06N 3/08
USPC ....................................................... 701/103
See application file for complete search history.

(56) References Cited

FOREIGN PATENT DOCUMENTS

DE 102017202554 A1 * 8/2017 ......... F02D 13/0261
EP 0724073 A2 * 7/1996 ......... F02D 41/1458
JP H0996236 A * 4/1997

OTHER PUBLICATIONS

JP H0996236 A) (Akira et al. ) (Apr. 8, 1997) (Machine Translation) (Year: 1997).*

* cited by examiner

*Primary Examiner* — Mahmoud Gimie
(74) *Attorney, Agent, or Firm* — Lorenz & Kopf LLP

(57) ABSTRACT

In various embodiments, methods, systems, and vehicle apparatuses are provided. In one exemplary embodiment, a method is provided that includes obtaining a set of inputs, by a processor, pertaining to one or more features that are used to predict the purge flow of a purge canister system of an intake system of a vehicle; obtaining data, by the processor, from sensors about the vehicle's intake system for use by a neural network to enable the processor to classify the set of inputs including the one or more features for purge flow control for use in predicting a presence of purge content in the vehicle's intake system; and obtaining, by the processor, an output from the neural network wherein the output is configured as a binary or continuous output to instruct a vehicle controller to execute an action to fueling control by letting fueling controller choose different gain sets and adaption strategy based on the binary output flag in a case of the binary-output model, or apply an adjustment factor to fueling command in case of a continuous model.

16 Claims, 8 Drawing Sheets

METHODS, SYSTEMS, AND APPARATUSES OF PURGE CONTENT ESTIMATION LOGIC FOR IMPROVED FUEL CONTROL

TECHNICAL FIELD

The present disclosure generally relates to vehicles and more particularly relates to systems and methods for implementing a neural network to predict purge vapor characteristics in a vehicle intake system to enable better injector fueling control, which in turn allows better capture of evaporative emissions.

Current technology relies on a delay model to determine when purge content is added or removed from the air intake following purge valve opening or closing and is often inaccurate, especially with a purge pump.

Inaccurate purge flow estimation can lead to vehicular stalls and poor drivability of a vehicle. In response, manufacturers often lower the purge command into intake systems in order to reduce vehicular stalls. However, while this method can reduce vehicular stalls, there are significant drawbacks such as increases in evaporative emissions and/or correspondingly more costs for evaporative emission hardware.

Accordingly, it is desirable to provide systems and methods implementing a neural network for enhanced estimations of purge flow in a vehicle's intake system so the injector fueling controller can adjust for upcoming disturbances introduced by purge vapor concentration fluctuation proactively. Furthermore, other desirable features and characteristics of the present disclosure will become apparent from the subsequent detailed description and the appended claims, taken in conjunction with the accompanying drawings and the foregoing technical field and background.

SUMMARY

In at least one exemplary embodiment, a method for operating canister purge is provided. The method for operating canister purge includes obtaining a set of inputs, by a processor, pertaining to one or more features that are used to control the purge flow of a purge canister system of an intake system of a vehicle; obtaining data, by the processor, from sensors about a vehicle's intake system for use by a neural network to enable the processor to classify the set of inputs including the one or more features for a purge flow control for use in predicting a presence of purge content in the vehicle's intake system; and obtaining, by the processor, an output from the neural network wherein the output is configured as a binary output to instruct a vehicle controller to execute an action of an injector fueling command.

In at least one embodiment, the method further includes the neural network that includes a convolution neural network (CNN) for classifying, by the processor, the set of inputs to predict the purge flow of the vehicle's intake system.

In at least one embodiment, the method further includes applying, by the processor, a convolution function of a first, a second, and a third layer of the CNN to classify the set of inputs composed of the one or more features into one or more feature matrices with size reductions for configuring a fuel control action based on the binary output.

In at least one embodiment, the method further includes applying, by the processor, a first dense function to vectorize a feature matrix received from an output from the third layer wherein a first dense function flattens the feature matrix into a single connected vector for configuring the fueling control action based on the binary output.

In at least one embodiment, the method further includes applying, by the processor, a second dense function to determine a resultant binary output based on the single connected vector received from the first dense function wherein the resultant binary output is either an ON flag or an OFF flag to indicate purge vapor existence in the intake system.

In at least one embodiment, the method further includes the neural network that includes a hybrid deep CNN with a recurrent neural network (RNN) for applying, by the processor, a gating action at a previous time (t−1) to a current time (t) of a difference of passing data to reduce the set of inputs for predicting purge flow of the vehicle's intake system.

In at least one embodiment, the method further includes executing, by the processor, a set of Long Short-Term Memory (LTSM) gates in a first and a second layer of the RNN wherein each LSTM gate is a forget gate in a sigmoid layer that executes a function passing on data in a forward propagation of an input at the previous time (t−1) to an output at the current time (t) wherein the output is a difference a previous input (t−1) and current input (t) reduces an input feature set to configure a fueling control action by a binary or continuous output.

In another exemplary embodiment, a system is provided. The system includes a set of inputs obtained by a processor that pertain to one or more features used to predict purge vapor characteristics in an intake system of a vehicle; a set of sensors to sense data about a vehicle's intake system to send to the processor for use in a neural network to enable the processor to classify the set of inputs including the one or more features for prediction of a presence of purge content in the vehicle's intake system; and an output from the neural network obtained by the processor wherein the output is configured as a binary or continuous output to instruct a vehicle controller including a fuel controller to execute an action of injector fueling control including: in response to an output configured as a binary model, the fuel controller utilizes a binary output based on the binary model to apply a different compensation logic using a plurality of gain sets and control strategies for accounting for characteristics of the intake system based on whether purge vapor is present or not in the intake system; and in response to an output configured in a continuous model, the fuel controller adjusts, based on the continuous model for one or more disturbances caused by fluctuations of purge vapor concentration in the intake system, by a proactive prediction of a drop of purge vapor concentration and an instructing of an action of an injector fueling control based on the proactive purge vapor prediction to increase an amount of fueling to an engine of the vehicle thereby avoiding occurrence by the engine of a lean combustion condition.

In at least one embodiment, the system further includes in response to the output configured in the continuous model, the fuel controller adjusts, based on the continuous model for one or more disturbances caused by fluctuations of purge vapor concentration in the intake system, by the proactive prediction of an increase in purge vapor concentration, and the instructing of the action of the injector fueling control based on the proactive purge vapor prediction to decrease an amount of fueling to an engine of the vehicle thereby avoiding occurrence by the engine of a rich combustion condition.

In at least one embodiment, the system further includes the continuous model that generates a continuous output with a value between zero and one that represents the purge vapor concentration in the intake system wherein a zero value represents no presences of hydrocarbon content in the intake system, and a value of one represents a fully saturated hydrocarbon content in the intake system.

In at least one embodiment, the system further includes the neural network that includes a convolution neural network (CNN), to classify the set of inputs for predicting the purge flow of the vehicle's intake system.

In at least one embodiment, the system further includes a first, a second, and a third layer of the CNN, each including a convolution function for classifying the set of inputs by convoluting actions of one or more features into one or more feature matrices with size reductions to generate the binary output to configure a fueling control action.

In at least one embodiment, the system further includes a first dense layer to receive an output from the third layer of the CNN wherein the first dense layer includes a first dense function which the processor executes to vectorize a feature matrix received from the output from the third layer wherein a first dense function flattens the feature matrix into a single connected vector to configure the fuel control action by the binary output.

In at least one embodiment, the system further includes a second dense layer to receive an output from the first dense layer, wherein the second dense layer includes a second dense function which the processor executes to determine a resultant binary output based on the single connected vector generated by the first dense function wherein the resultant binary output is either an ON flag or an OFF flag to indicate purge vapor existence in the intake system.

In at least one embodiment, the system further includes the neural network, including a hybrid deep CNN with a recurrent neural network (RNN) that is obtained by the processor in which the processor applies a gating action at a previous time (t−1) to a current time (t) of a difference of passing data to reduce the set of inputs to predict purge vapor characteristics of the vehicle's intake system.

In at least one embodiment, the system further includes a set of Long Short-Term Memory (LTSM) gates is executed by the processor in a first and a second layer of the RNN wherein each LSTM gate is a forget gate in a sigmoid layer that, upon execution, enables passing of data in a forward propagation of an input at a previous time (t−1) to output at a current time (t) wherein a difference of a previous input (t−1) and current input (t) reduces an input feature set to configure a fueling control action by the binary or continuous output.

In yet another exemplary embodiment, a vehicle apparatus is provided. The vehicle apparatus includes an intake system coupled to a set of sensors generate sensed data about operations of the intake system; a purge canister system contained in the intake system including a charcoal canister and a purge valve for allowing purge content from the charcoal canister in the intake system to enter into an engine; and a vehicle controller including a processor wherein the processor is coupled to a neural network and configured to: obtain a set of inputs that pertain to one or more features used to predict purge vapor characteristics in the engine intake system; obtain the sensed data for use by the neural network to enable the processor to classify the set of inputs that include one or more features for purge flow control for use to predict a presence of purge content in the vehicle's intake system; and obtain an output from the neural network wherein the output is configured as a binary output to instruct a vehicle controller to execute an action to the injector fueling controller to take action (for example, switching gain sets and adaption method based on model output in case of the binary model and applying a correction factor that is the output of the model in case of the continuous model) in expectation of purge content change.

In at least one exemplary embodiment, the vehicle apparatus further includes the processor configured to implement the neural network that includes a convolution neural network (CNN) to classify the set of inputs to predict the purge flow of the vehicle's intake system.

In at least one exemplary embodiment, the vehicle apparatus further includes the processor configured to apply a convolution function of a first, a second, and a third layer of the CNN to classify the set of inputs composed of the one or more features into one or more feature matrices with size reductions for configuring a fueling control action based on a binary or continuous output.

In at least one exemplary embodiment, the vehicle apparatus further includes the processor configured to: apply a first dense function to vectorize a feature matrix received from an output from a third layer wherein a first dense function flattens the feature matrix into a single connected vector to configure the fuel control action based on the binary output; apply a second dense function to determine a resultant binary output based on the single connected vector received from the first dense function wherein the resultant binary output is either an ON action or an OFF action to predict the purge canister system; implement the neural network which includes: a hybrid deep CNN with a recurrent neural network (RNN) that applies a gating action at a previous time (t−1) to a current time (t) of a difference of passing data to reduce the set of inputs for controlling purge flow of the vehicle's intake system; and execute a set of Long Short-Term Memory (LSTM) gates in a first and a second layer of the RNN wherein each LSTM gate is a forget gate in a sigmoid layer that executes a function passing on data in a forward propagation of an input at the previous time (t−1) to an output at the current time (t) wherein a difference a previous input (t−1) and current input (t) reduces an input feature set for configuring a fueling control action by the binary or continuous output.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application-specific integrated circuit (ASIC), a field-programmable gate array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems and that the systems described herein are merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
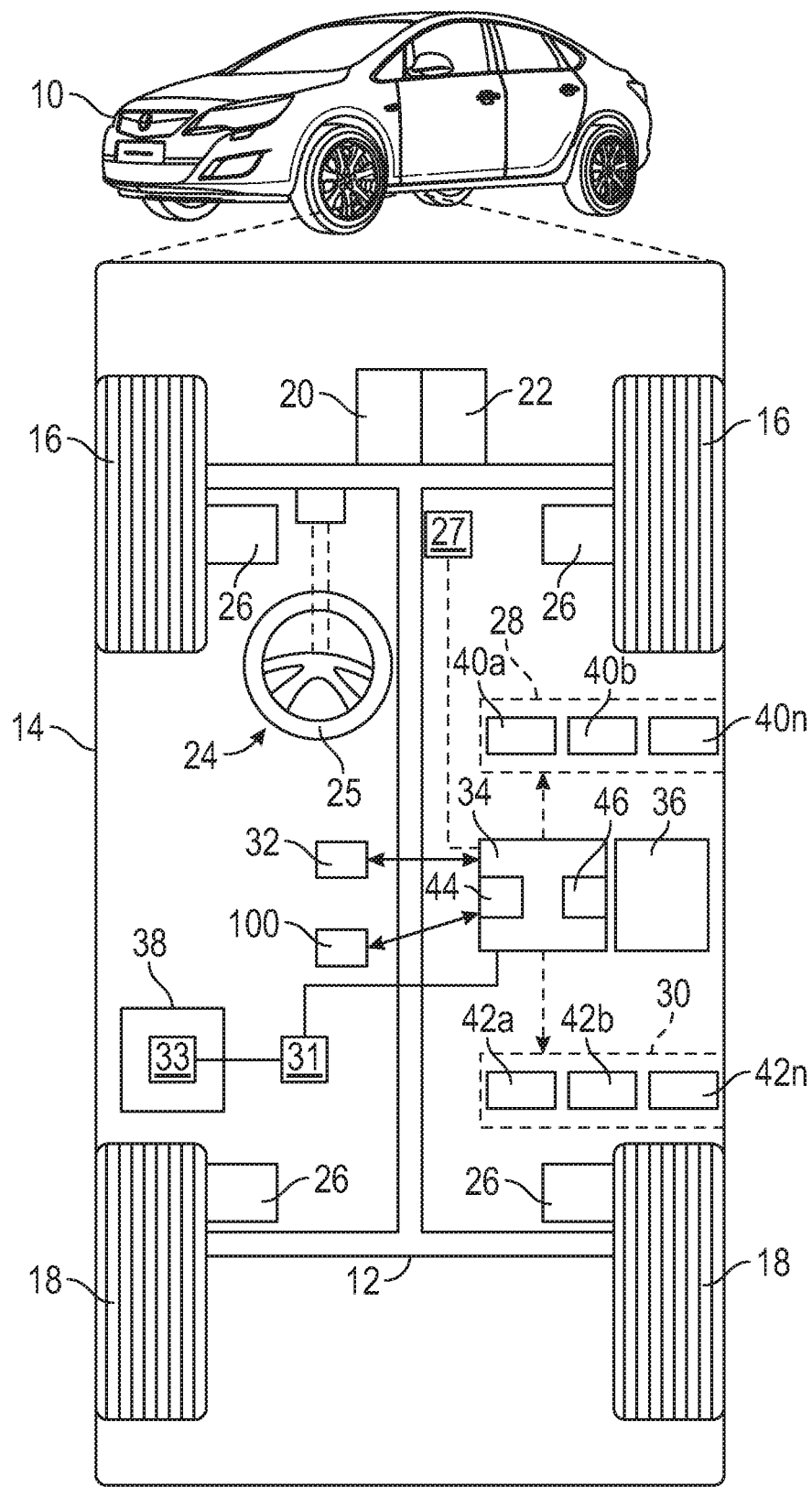
FIG. 1 is a functional block diagram illustrating an autonomous or semi-autonomous vehicle having a control system that controls vehicle actions based on using a neural network to predict purge vapor characteristics in an intake system, in accordance with exemplary embodiments.

With reference to FIG. 1, a control system 100 is associated with a vehicle 10 (also referred to herein as a "host vehicle") in accordance with various embodiments. In general, the control system (or simply "system") 100 provides for control of various actions of the vehicle 10 (e.g., emissions flow control) based on a trained neural network-based model that controls operation in response to data from vehicle sensor inputs, for example as described in greater detail further below in connection with FIGS. 2-5.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the wheels 16, 18 include a wheel assembly that also includes respectively associated tires.

In various embodiments, the vehicle 10 is an autonomous or semi-autonomous vehicle, and the control system 100, and/or components thereof, are incorporated into the vehicle 10. The vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

As shown, the vehicle 10 generally includes a propulsion system 20, a transmission system 22, a steering system 24, a brake system 26, a canister purge system 31, one or more user input devices 27, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmissions.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences the position of the vehicle wheels 16 and/or 18. While depicted as including a steering wheel for illustrative purposes, in some embodiments contemplated within the scope of the present disclosure, the steering system 24 may not include a steering wheel.

The controller 34 includes at least one processor 44 (and neural network 33) and a computer-readable storage device or media 46. As noted above, in various embodiments, the controller 34 (e.g., the processor 44 thereof) provides data pertaining to a projected future path of the vehicle 10, including projected future steering instructions, to the steering control system 84 in advance, for use in controlling steering for a limited period of time in the event that communications with the steering control system 84 become unavailable. Also, in various embodiments, the controller 34 provides communications to the steering control system 84 34 via the communication system 36 described further below, for example, via a communication bus and/or transmitter (not depicted in FIG. 1).

In various embodiments, controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chipset), any combination thereof, or generally any device for executing instructions. The computer-readable storage device or media 46 may include volatile and non-volatile storage in read-only memory (ROM), random-access memory (RAM), and keep-alive memory (KAM), for example. KAM is a persistent or non-volatile memory that may be used to store multiple neural networks, along with various operating variables, while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals from the sensor system 28, perform logic, calculations, methods, and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

As depicted in FIG. 1, the vehicle 10 generally includes, in addition to the above-referenced steering system 24 and controller 34, a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the wheels 16, 18 include a wheel assembly that also includes respectively associated tires.

In various embodiments, the vehicle 10 is an autonomous vehicle, and the control system 100, and/or components thereof, are incorporated into the vehicle 10. The vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

As shown, the vehicle 10 generally also includes a propulsion system 20, a transmission system 22, a brake system 26, one or more user input devices 27, a sensor system 28, an actuator system 30, at least one data storage device 32, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmissions.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences the position of the vehicle wheels 16 and/or 18. While depicted as including a steering wheel for illustrative purposes, in some embodiments contemplated within the scope of the present disclosure, the steering system 24 may not include a steering wheel.

The canister purge system 31 is controlled via the processor 44. Logic using a neural network 33 can predict whether or not purge content is present in the intake system 38 of the vehicle based on an array of input signals (not shown), including a purge valve DC, airflow, Wide Range Air Fuel (WRAF) sensors, etc. In an alternative exemplary embodiment, the canister purge system 31 can be implemented to predict via the processor 44 a level of vapor concentration in the intake system. The output from the processor 44 is either a binary bit or a continuous value between 0-1. The neural network 33 model doesn't control purge related actuators.

The controller 34 includes an injector fueling controller that will be directly affected based on the neural networks 33 model's output (the injector fueling controller is also referred to as a closed-loop fueling control, as it functions to close a loop based on an O2 sensor). The injector fueling controller affects fueling control by letting the fueling controller choose different gain sets and adaption strategies (i.e., the LTM compared to PLM operations where the former is for purge off, and later is for purge on actuations) based on the binary output flag (in this case the output of the binary-output model). In an exemplary embodiment, the feed-forward operation can be applied for an adjustment factor that is the continuous output between 0-1 of the neural network 33 models to generate a fueling command (in case of a continuous neural network 33 model, for example, if the continuous purge prediction neural network 33 outputs 0.2, this entails that the current purge concentration will account for approximately 20% of needed fuel, and fueling control will cut 20% fueling command to the injector to offset purge).

In various embodiments, one or more user input devices 27 receive inputs from one or more passengers of the vehicle 10. In various embodiments, the inputs include a desired destination of travel for the vehicle 10. In certain embodiments, one or more input devices 27 include an interactive touch-screen in the vehicle 10. In certain embodiments, one or more inputs devices 27 include a speaker for receiving audio information from the passengers. In certain other embodiments, one or more input devices 27 may include one or more other types of devices and/or may be coupled to a user device (e.g., smartphone and/or other electronic devices) of the passengers.

The sensor system 28 includes one or more sensors 40a-40n that sense observable conditions of the exterior environment and/or the interior environment of the vehicle 10. The sensors 40a-40n include but are not limited to, radars, lidars, global positioning systems, optical cameras, thermal cameras, ultrasonic sensors, inertial measurement units, and/or other sensors.

The actuator system 30 includes one or more actuators 42a-42n that control one or more vehicle features such as, but not limited to, canister purge system 31, the intake system 38, the propulsion system 20, the transmission system 22, the steering system 24, and the brake system 26.

In various embodiments, vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 store data for use in automatically controlling the vehicle 10, including the storing of data of a neural network used to predict purge vapor concentration in engine air intake system 38 used for the vehicle control. In various embodiments, the data storage device 32 stores a machine learning model of a trained neural network as well as other data models such as defined maps of the navigable environment. In various embodiments, the trained neural network may be predefined by and obtained from a remote system. For example, the neural network may be trained by a supervised learning methodology by a remote system and communicated or provisioned in the vehicle 10 (wirelessly and/or in a wired manner) and stored in the data storage device 32.

A neural network can also be trained via supervised or unsupervised learning based on vehicle data. The processor 44 can implement the logic for prediction of the canister purge system 31 that can achieve finer resolution and accuracy than the use of a delay type model to determine when purge content is added or removed from the canister. The logic implemented by the processor 44 can enable a simulation model for validation with real vehicle data collected by an actual air-fuel sensor that is installed between the throttle and intake duct.

In various exemplary embodiments, the trained neural network model can be implemented by the processor 44 to predict purge vapor concentration in at least two variations composed of different levels of capability depending on the desired implementation. In the first variation, the logic of the controller predicts from a set of sensor inputs whether purge vapor is in the intake system 38. The output of the logic will be a binary flag. Downstream processes such as the injector fueling controller's long-term adaption logic will switch between different gain sets and learning rates based on this logic flag. For example, a purge logic module/logic trigger module logic will compensate the injector fueling from the purge flow on or off as determined by the estimated purge vapor in the intake system 38.

In the second variation, the output of predicts purge vapor concentration directly and outputs a continuous ratio between 0 and 1. This ratio will be applied to injector fueling correction directly to offset the impact from purge vapor. For example, if the continuous purge prediction neural network outputs 0.2, this means the predicted purge concentration accounts for 20% of the needed fuel. And fueling controller will command a decrease of about 20% fueling from injectors to offset purge). In other words, the ratio between 0 and 1 realizes the amount of real-time purge vapor fuel contained in the intake system 38.

The data storage device 32 is not limited to control data, as other data may also be stored in the data storage device 32. For example, route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 implements the logic model to predict purge vapor concentration in the engine air intake, includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chipset), any combination thereof, or generally any device for executing instructions. The computer-readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals from the sensor system 28, perform logic, calculations, methods, and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

Figure 2:
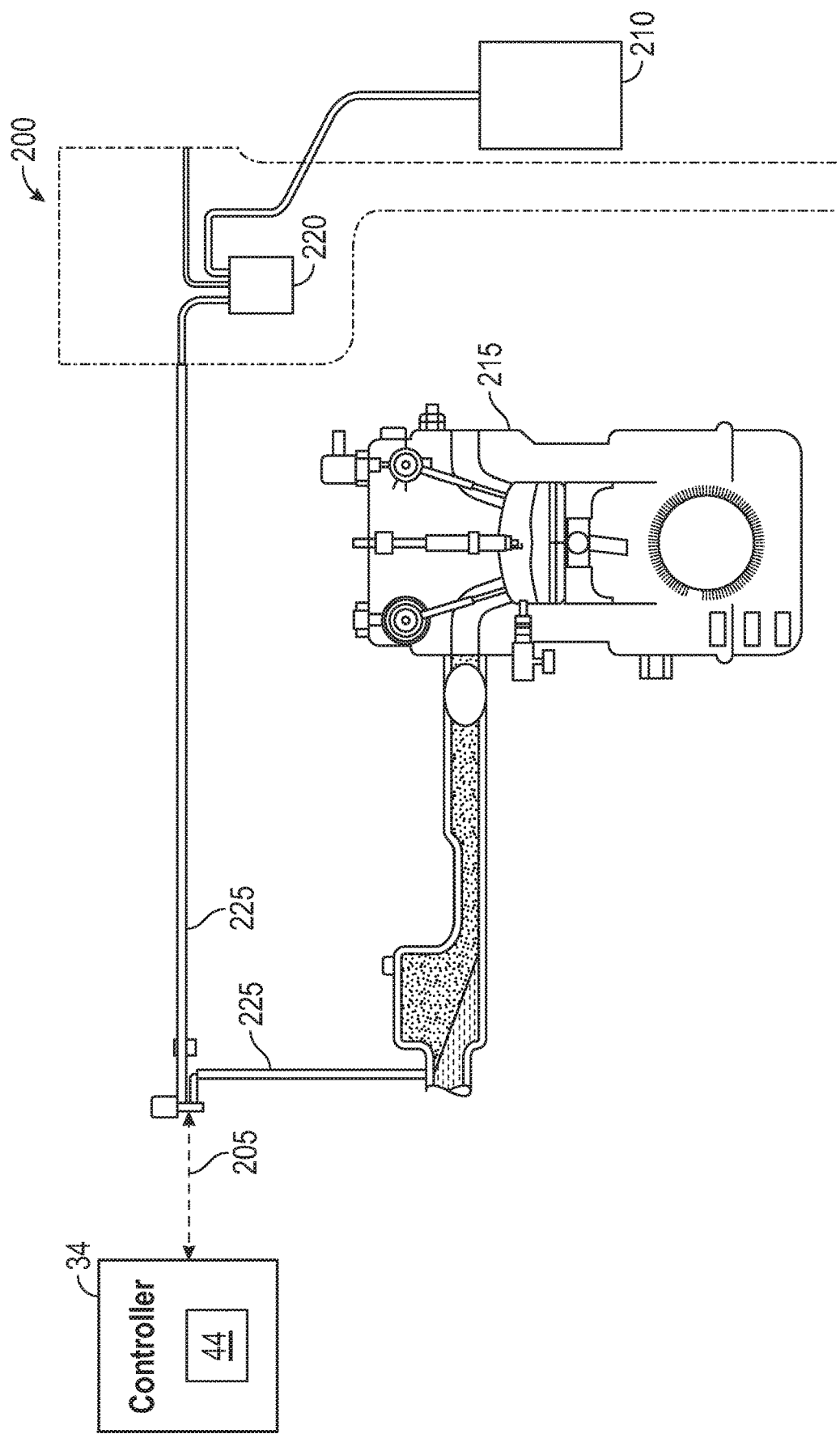
FIG. 2 is a diagram illustrating a canister purge system which can be implemented with a controller using the neural network to predict purge vapor characteristics of an intake system, in accordance with various embodiments.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

In various embodiments, the communication system 36 is used for communications between the controller 34, including data pertaining to a projected future path of the vehicle 10, including projected future steering instructions. Also, in various embodiments, the communication system 36 may also facilitate communications between the steering control system 84 and/or more other systems and/or devices.

In certain embodiments, the communication system 36 is further configured for communication between the sensor system 28, the input device 27, the actuator system 30, one or more controllers (e.g., the controller 34), and/or more other systems and/or devices. For example, the communication system 36 may include any combination of a controller area network (CAN) bus and/or direct wiring between the sensor system 28, the actuator system 30, one or more controllers 34, and/or one or more other systems and/or devices. In various embodiments, the communication system 36 may include one or more transceivers for communicating with one or more devices and/or systems of the vehicle 10, devices of the passengers (e.g., the user device 54 of FIG. 2), and/or one or more sources of remote information (e.g., GPS data, traffic information, weather information, and so on).

With reference now to FIG. 2, FIG. 2 is a diagram illustrating a canister purge system that can be implemented with a controller using the neural network to predict purge vapor characteristics in an intake system in accordance with various embodiments. In FIG. 2, the canister purge system 200 includes a fuel tank 210 that stores fuel, and a charcoal canister 220 capturing evaporative emissions produced by evaporating fuel stored in the fuel tank 210.

The fuel tank 210 is connected by a fuel line to the engine 215. The fuel tank 210 is connected to the charcoal canister 220 by a fuel tank vapor line 225. A purge solenoid valve 205 is installed in the fuel tank vapor line 225 and prevents fuel vapors from the fuel tank 210 to escape into the atmosphere by temporarily trapping the vapors in the charcoal canister 220 and controlling the amount of fuel vapor that is purged from the charcoal canister 220. The purge valve is an electrically-operated solenoid that is controlled by a controller (i.e., controller 34 that includes the processor 44 of FIG. 1). When the engine is off, the controller 34 turns off the purge solenoid valve 205 (i.e., the purge solenoid valve 205 is closed). When the engine was running and warmed up, the controller 34 gradually opens the purge solenoid valve 205 to allow some amount of fuel vapors to be moved from the charcoal canister 220 and burned in the engine 215. One side of the purge solenoid valve 205 is connected to the charcoal canister 220. The other side is connected to the air intake of the engine 215. The purge content prediction logic is implemented by offline training either by supervised or unsupervised learning processes to enable a trained convolutional neural network (CNN) and/or recurrent neural network (RNN) described in FIGS. 3A-B and FIGS. 4A-B for use in vehicle operations.

Figure 3A:
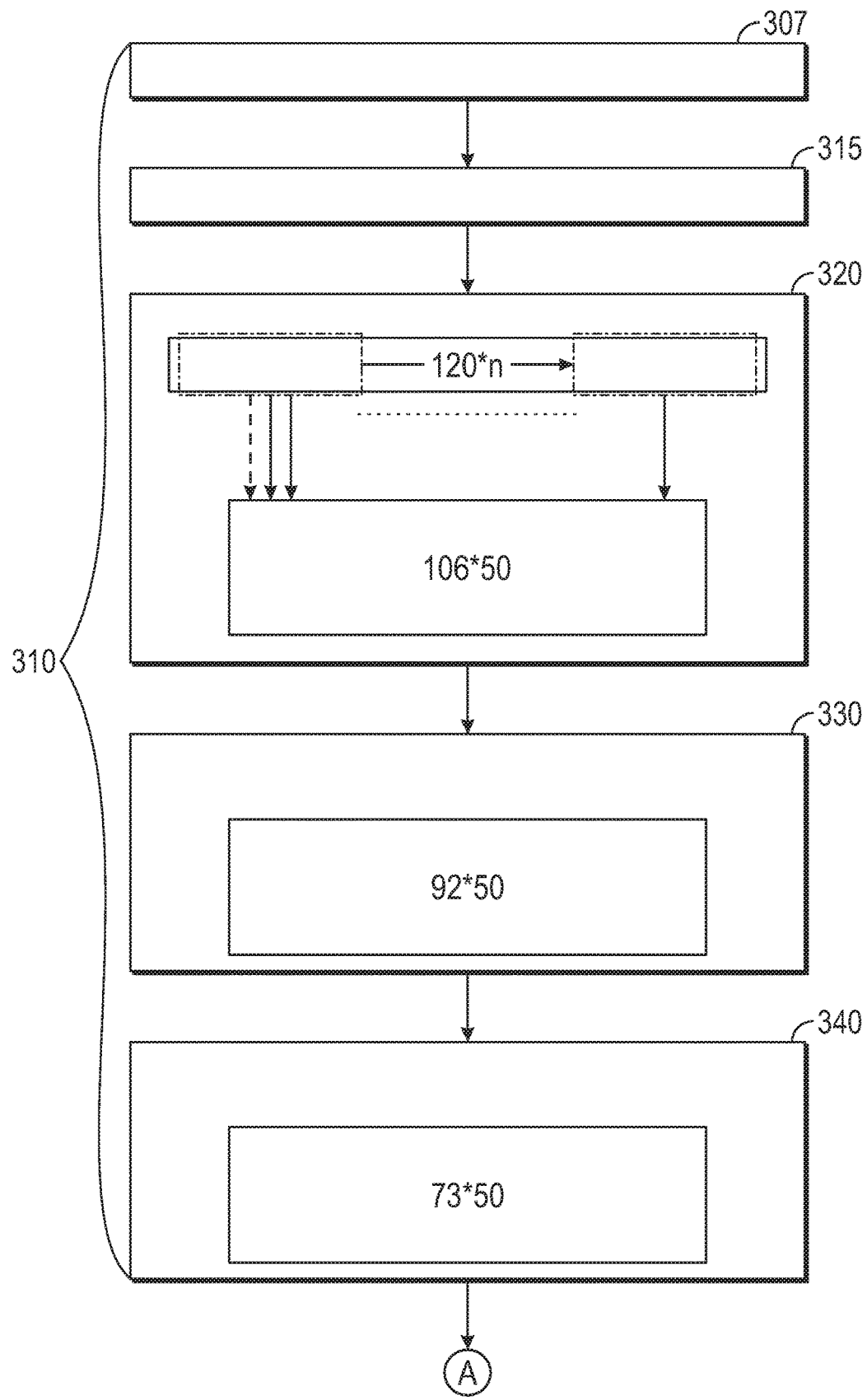
FIGS. 3A and 3B are functional block diagrams illustrating a 3 layer convolutional neural network (CNN) with 2 dense layers implemented to predict the canister purge system illustrated in FIGS. 1-2, in accordance with various embodiments.
Figure 3B:
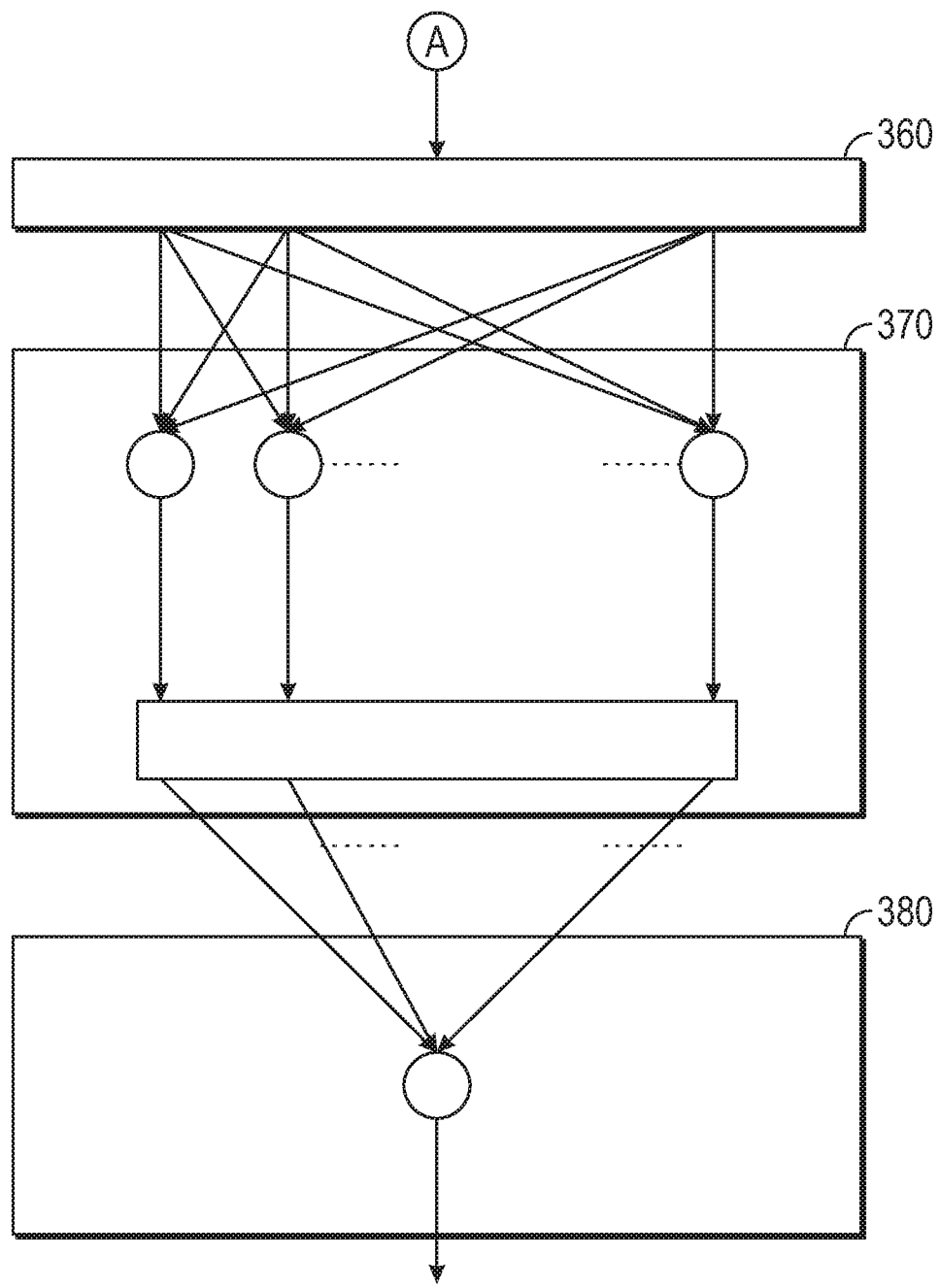

FIGS. 3A and 3B are functional block diagrams illustrating a neural network composed of a 3 layer convolutional neural network (CNN) with two dense layers that have been trained offline and enables control of operations of the fuel control system in coordination with the canister purge system illustrated in FIGS. 1-2, in accordance with various embodiments.

The neural network is used to inform the controller of purge flow characteristics and is configured as an already trained neural network. Hence, in certain embodiments, the process of the 3 layer classifier with 2 dense layers is configured in an operational mode only. For example, in various embodiments, the neural network is trained during a training mode prior to use or provisioned in the vehicle 10 (or other vehicles). Once the neural network is trained, it may be implemented in a vehicle (e.g., the vehicle 10) in an operational mode, in which the vehicle 10 is operated in an autonomous, semi-autonomous or manual manner.

In various alternative exemplary embodiments, it will be appreciated that the neural network may also be implemented in both the training mode and the operational mode in a vehicle and trained during an initial operation period in conjunction with operations of a time delay or like methodology for purge flow prediction. Also, the neural network may be performed not at different times and not continuously with conventional purge flow technologies. Also, a vehicle 10 may operate solely in the operating mode with neural networks that have already been trained via a training mode of the same vehicle 10 and/or other vehicles in various embodiments.

In FIGS. 3A and 3B, the convolutional neural network (CNN) system 300 includes a CNN classifier 310 ("classifier") composed of 3 layers. The classifier 310 is a trained classifier (i.e., the training has occurred offline prior to use) that has already been configured with weighting in each layer to better classify the input set of features (i.e., reduce the feature set in each layer) to an appropriate classification that can be implemented to predict purge vapor concentration in engine air intake system. The classifier 310 receives an input set 307 configured as an input tensor, at task 315, composed of approximately 120 input steps (sampled at 80 ms per time step) of a set of "n" inputs. The "n" inputs are composed of the features received by the purge canister system controller and relate to controlling the purge canister system operations.

The features sent as inputs include engine speed, air mass per cylinder event, purge valve duty cycle, wastegate position (optional), oxygen sensor output, fueling command, cam phaser position, manifold air pressure, manifold air temperature, spark timing, boost pressure ratio (optional), and throttle position. The set of input features presented should not be considered as all-encompassing, as it is contemplated that the input set is used to predict purge vapor concentration in the engine air intake system. For example, the input set of "n" inputs can be augmented, changed, or reduced depending on the inputs required in the operation of the purge canister system. In certain instances, the feature set may relate to the type and size of the engine used in the vehicle and/or the size of the fuel tank for purge operations. That is, especially in the case of use of larger sized fuel tanks, the classifier 310 output by implementing the CNN for control, provides a more accurate operation of the canister purge flow (as shown in the graph in FIG. 6) compared to the use of a conventional transport delay purge flow control.

An output from the neural network is a binary or continuous output to instruct a vehicle controller to execute an action to injector fueling control. In various exemplary embodiments, the output from the neural network is configured as a binary or continuous output to instruct a vehicle controller to execute an action to the fueling control by letting the fueling controller choose different gain sets and adaption strategy based on the binary output flag (in an exemplary binary-output model) or apply an adjustment factor to fueling command in an exemplary continuous neural network model.

In an exemplary embodiment, in a binary model in operation, the binary output may enable the fueling controller to apply a different compensation logic to utilize a set of different gains and control strategies to take into account operation in multiple types of systems that each possess different characteristics. For example, the different characteristics may be displayed when purge vapor is present and is not present in the vehicle's intake system. Therefore the fueling controller must realize the characteristic differences.

In an exemplary embodiment, in a continuous model in operation, the continuous output may have values in a range between approximately zero "0" and one "1". This continuous value represents vapor concentration in the intake system, with an approximately zero "0" value indicating that there is no hydrocarbon content predicted in the vehicle's intake system; and an approximately one "1" value indicating that there is a full or nearly full saturation level of hydrocarbon content predicted in the vehicle's intake. The continuous output from this version of the neural network enables the fueling controller to adjust for upcoming disturbances introduced or that occur by purge vapor concentration fluctuations or changes in a proactive manner that enables a faster response and a more accurate response to purge vapor concentration levels. For example, in instances when purge concentration is high, and the logic (as instructed by the trained neural network) is able to predict the purge content is about to drop sharply; the fueling controller is able to read or receive the prediction (faster or in advance of the anticipated change) and instruct the fuel control injector accordingly to proactively increase fueling to avoid the vehicle's engine experiencing lean combustion.

When a similarly opposite condition occurs, that is vice versa, when the presence of no purge vapor concentration is present in the vehicle's intake system, but the trained neural network will predict that the purge vapor concentration is about to or will sharply increase. In this instance, the fuel control injector will operationally be able to proactively cut down the fuel flow to the vehicle's engine to avoid a condition of rich combustion. The rich combustion condition is avoided or is achieved by applying an adjustment factor to a fueling command that instructs the fuel control injector operations based on the output ratio. That is, the fueling control is affected by letting fueling the controller choose different gain sets and adaption strategies based on the binary output flag (in case of the binary-output model); and in the feed-forward operation, apply an adjustment factor for a continuous output in a range between zero and one for the fueling command (in the case of the continuous model, for example, if the continuous purge prediction neural network outputs 0.2, this is because (or may indicate) the predicted purge concentration accounts for 20% of needed fuel, and fueling control will require a decrease of about 20% fueling via an appropriate command to the fuel control injector to offset purge). Note this happens upstream of the Oxygen sensor; hence this feed-forward method brings a faster response compared to the traditional O2 sensor-based feedback method.

The first layer or level of the classifier 310 at task 320 applies approximately 50 filters of a kernel size 15*n with increments of 1 for outputting a feature map composed of a matrix of convoluted features that result from the matrix multiplication of 106*50.

The convolution (*) applied in each level of the classifier (i.e., filter action in the CNN layer 1) is functionally shown in the below equation (where n denotes the number of the input channel, m denotes the number of convolutional filters):

$$Xi^{(m)} = \sigma\left(\sum_{c=1}^{n} W_i^{(c,m)} * X_{i-1}^{(n)} + b_i^{(m)}\right)$$

The convolution (*) operation in the first level of the CNN (i.e., the CNN layer 1) is configured with m=50 sets of filters, each with a size of 15 by n (i.e., 50 by 15 by n). The convolution operation (*) between input channel c of the input $X_{i-1}^{(c)}$ (i.e., the input set) and the $m^{th}$ filter of such channel $W_i^{(c,m)}$ creates the $m^{th}$ output feature map $Xi^{(m)}$ where the vector $b_i^{(m)}$ is a bias vector that is implemented for the first level of a CNN. There are 50 15 by n filters convoluted in the first layer to create the first level convoluted feature map. The convoluted operations are passed through in each step of the sampled data at a stride of 1 and with the same convolution (*) operation (plus bias and activation) to generate the output value. With 120 input steps and 50 filters at size 15, this results in output of shape 106 by 50, which comes from: ((120−15+1) by 50).

At task 330, the input set is passed through to the second level of convolution in another layer. In the second level, the second layer in the classifier 310 executes another convolution (*) operation similar to level 1 (i.e., the CNN layer 1). In the second level, the output is a feature map of approximately 92 by 50. At task 340, the input set is passed through the third layer for a third level to apply the convolution function layer to the data in the classifier 310. The third level application of the convolution (*) operation is similar to the convolution functions in the first and second levels and further refines the output of the convoluted matrix. In the third level, the convoluted feature map is approximately 73 by 50. At task 360, a flatten operation takes place, and the resultant flattening or vectorization of the convoluted feature map creates a long vector of 3650 by 1. The flattening operation pools the feature map from a 2-dimensional structure to a flat level single long vector. In this case, the resultant vector is a long single feature connected vector of 3650 by 1 for the input set. The two-dimensional matrix of the feature map in task 350 is flattened to a single connected neural network classifier or long single feature vector. At task 370, a first dense (fully connected) layer is created of size 50 by 1.

The mathematical representation of a dense layer can be written as:

$$y_i = \sigma(\Sigma_j w_{i,j} x_j + b_i)$$

where i denotes the ith output (in this case there are 50 in total), j denotes jth element from the input vector (total of 3650 in this case) σ is the activation function ('ReLu' in this case). $w_{i,j}$ is the (i,j)th element in the weight matrix $b_i$ is the ith element of bias vector. The output of this layer is 50 by 1. It can be inferred that the weight matrix is of size 50 by 3650 and bias vector is 50 by 1.

At task 380, a second dense object is specified of output 1 by 1. The densely connected layer provides a combination of categories from the data from the previous dense layer (i.e., linear operation of the previous layer), and the convolutional layers in the first 3 levels pass through a consistent set of features (i.e. a filtering operation in the first 3 layers). The resultant is a binary output that represents a logic flag of whether or not there is purge vapor in the intake system. This signal will control the injector fueling compensation logic to utilize different gain sets and control strategy to account for different system characteristics when there is purge vapor in intake vs. not. In various embodiments, the CNN is stored in a memory onboard the vehicle, such as the computer-readable storage device or media 46 of FIG. 1.

Figure 4A:
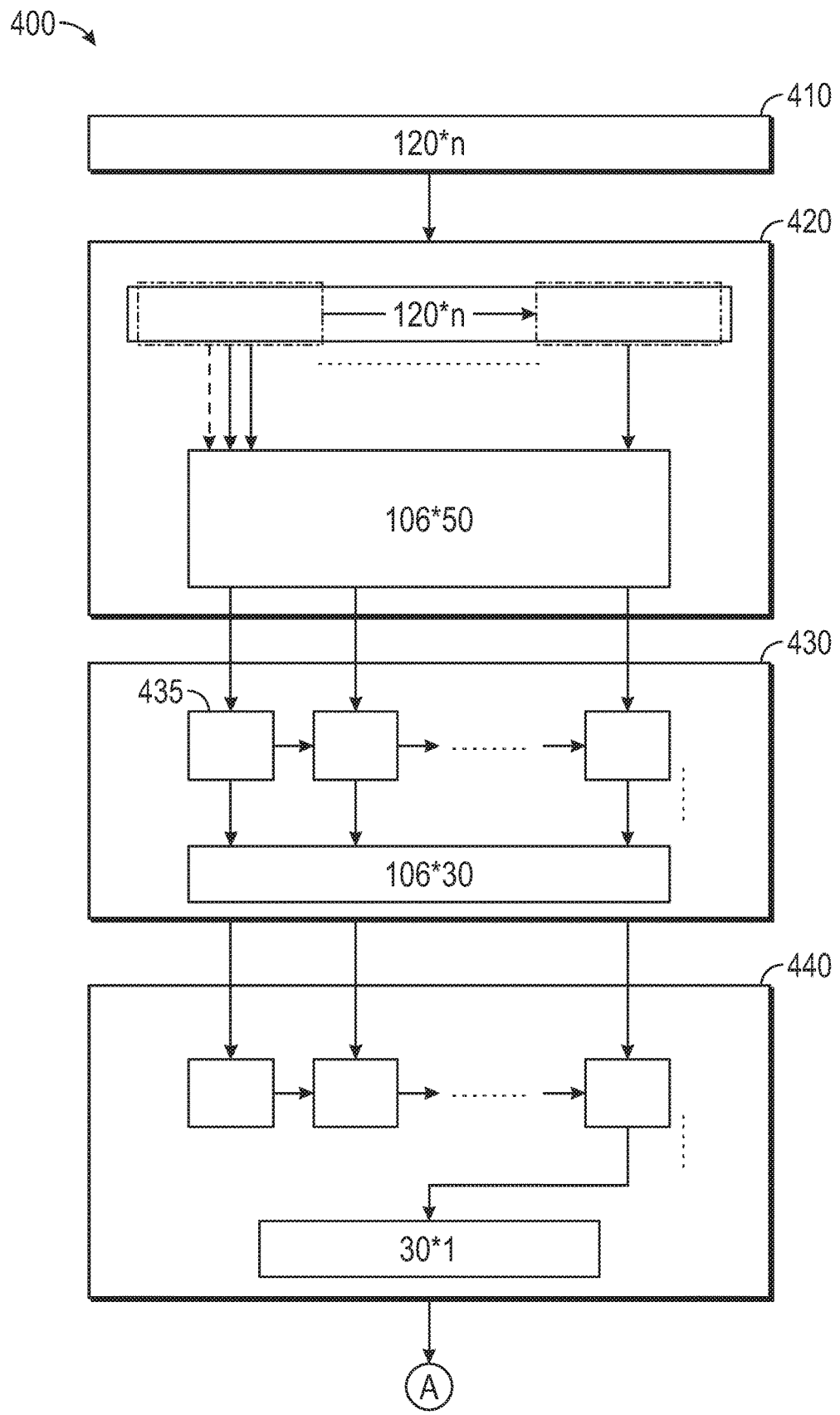
FIGS. 4A and 4B are functional block diagrams illustrating a Long Short-Term Memory (LSTM) deep 2 layers a hybrid recurrent neural network (RNN) plus CNN with 2 dense layers implemented to predict the canister purge system illustrated in FIGS. 1-2, in accordance with various embodiments.
Figure 4B:
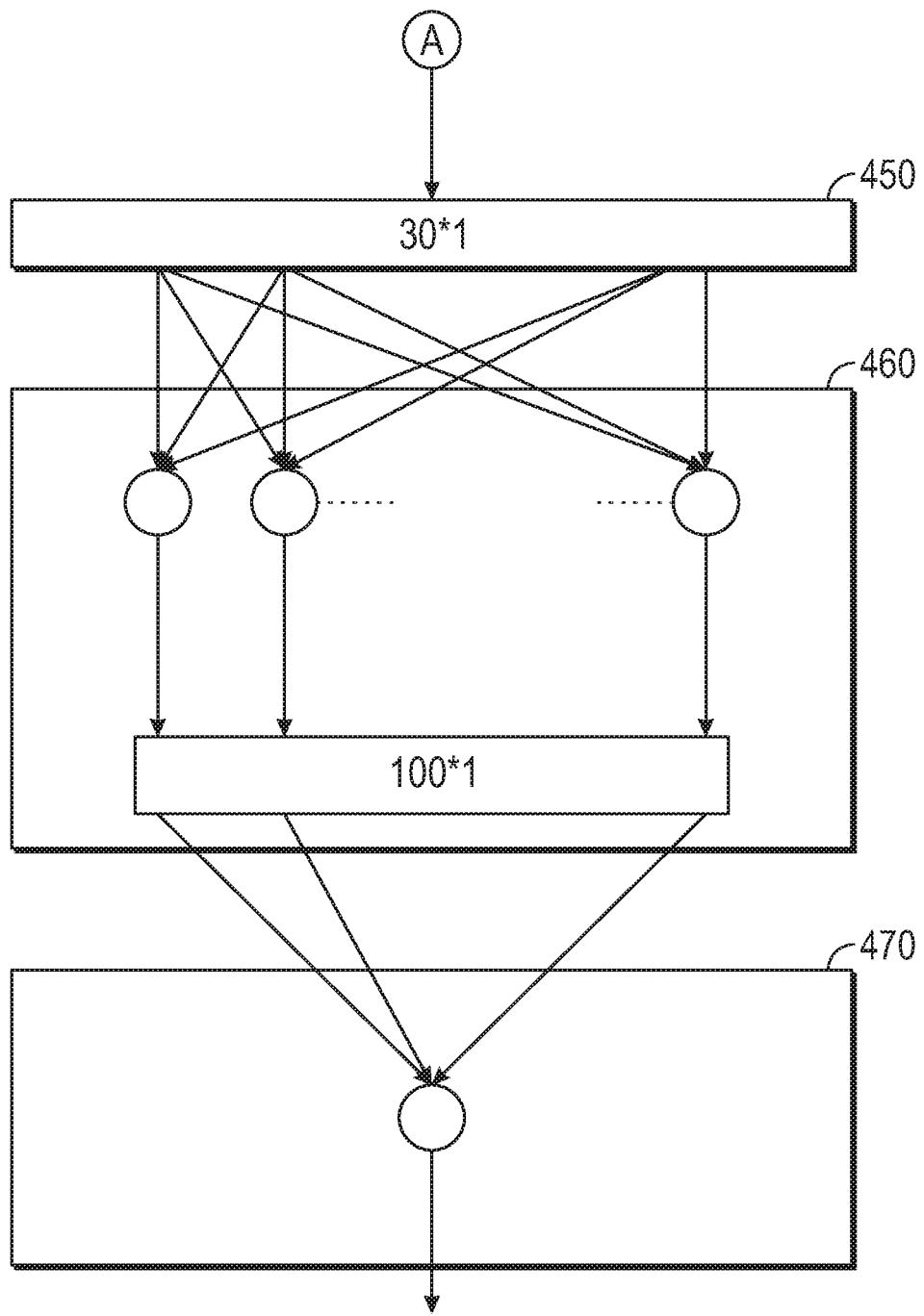

FIGS. 4A and 4B are functional block diagrams illustrating a variation of the model, utilizing Long Short-Term Memory (LSTM) layers to form a hybrid neural network with CNN layer. The model is complemented by 2 dense layers implemented to predict vapor concentration in the intake system in accordance with various embodiments. FIGS. 4A and 4B are an alternative implementation of the neural network prediction for the purge flow shown in FIGS. 3A and 3B. In FIGS. 4A and 4B, at task 410, the input tensor for the hybrid RNN+CNN 400 receives the same input set as in FIGS. 3A-3B of 120 input steps, n inputs (120 by n). The input (n) is the same feature set as in FIGS. 3A-3B. At task 420, of the hybrid RNN+CNN, the n inputs of 120*n are filtered by a set of 50 filters of kernel size 15, stride 1 for an output of 106 by 50.

At the first level of the hybrid RNN+CNN, in LSTM layer 1, 30 LSTM units are applied on the input matrix (which has the size of 106 by 50). Each LSTM (435) gate executed is a forget gate in a first sigmoid layer with a function passing on data at it propagates forward from an input at a previous time (t−1) to a current time (t). The differences in previous input (t−1) and current output (t) of data are defined by the equation for the forget gate of $f(t) = \sigma_0 + W_f * ([h_{t-1}, x_t] + b_f)$, which are the operations within each of the LSTM's cells.

At task 430, the output sequences from each of the LSTM' cells form a 106 by 30 output matrix. At task 440, The second LSTM layer is configured similarly to the first with 30 LSTM units. However, the second layer only outputs the last element of the sequences from each unit; hence the output size is 30 by 1. At task 450, the 30 by 1 matrix is input to the dense layer 1, which is a fully connected vector of 100 units in total for output of 100 by 1. The second dense layer, at task 470, is a fully connected vector of 1 by 1 for a continuous output between 0-1 representing vapor concentration in the intake system, with 0 being no hydrocarbon content in the intake and 1 being fully saturated hydrocarbon content in intake for controlling the fuel injection correction.

Figure 5:
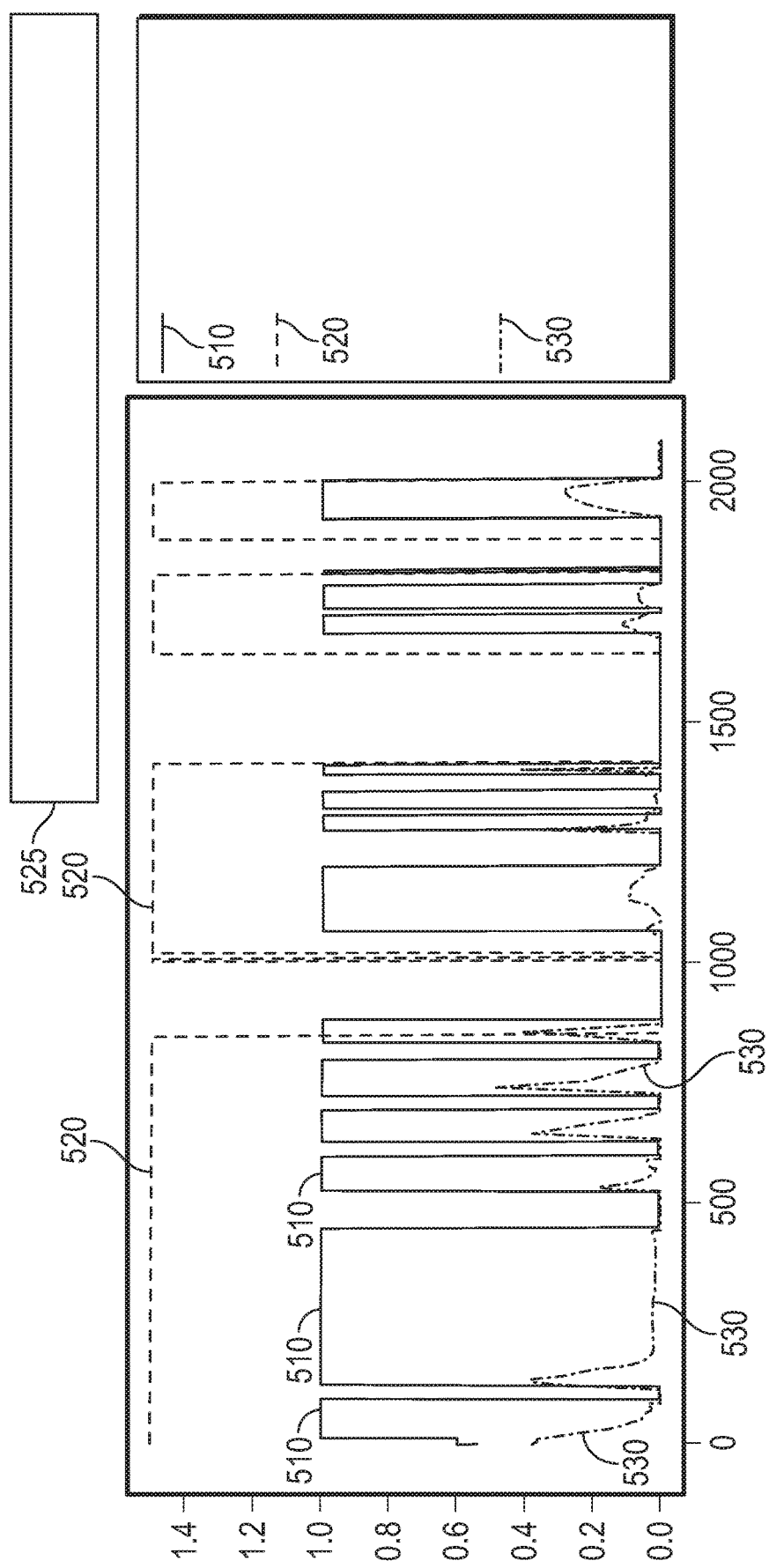
FIG. 5 is an exemplary graph that illustrates the prediction of a binary flag indicating purge vapor's existence in the intake system, the current logic of purge vapor using transport delay, and the measured purge vapor in an intake system, in accordance with various embodiments.

With reference to FIG. 5, FIG. 5 is an exemplary graph that illustrates the prediction of purge vapor existence via CNN based binary model, the current logic of purge vapor using transport delay, and the measured purge vapor in an intake system. The prediction of purge vapor graph 510 shows logic that better recognizes the presence of purge vapor shown in graph 530 than the conventional transport delay process graph 520. The conventional transport delay process graph 520 indicates at spots 525 there is still purge vapor present when there is, in fact, no purge vapor present.

Figure 6:
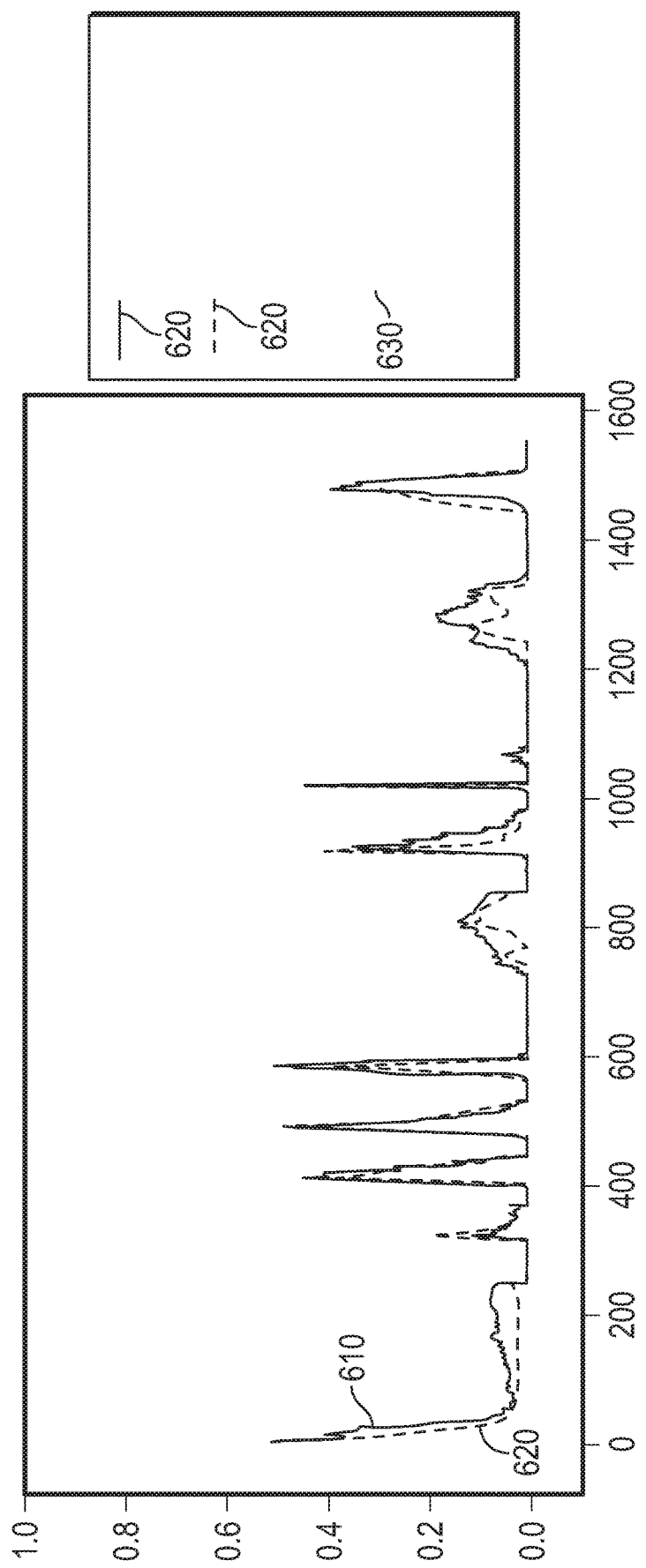
FIG. 6 illustrates an exemplary graph that illustrates the prediction of continuous purge vapor concentration in an intake system by hybrid CNN+RNN model against measured purge vapor in an intake system via an instrumented air-fuel sensor, in accordance with various embodiments.

With reference to FIG. 6, FIG. 6 illustrates an exemplary hybrid CNN+RNN graph of 120 input steps of 80 ms, in accordance with various embodiments. The neural network model graph 610 shows the continuous model's output accurately follows the measured amounts of purge vapor in the intake system, as shown in the purge vapor graph 620. The neural network model's vapor representation is accurate enough to replace the conventional purge long-term memory (PLM, which is used for injector fueling compensation during purge On activity). The neural network achieves a finer resolution and accuracy training from real vehicle data collected with the actual air-fuel sensor installed between the throttle and the intake duct. The air-fuel sensor is instrumentation to collect training data for the neural network model. It will not be present in production vehicles.

Per the discussion above, in various embodiments, multiple neural networks serve as purge flow models that are trained from empirical data offline. Also, in various embodiments, the inputs to the neural networks include purge canister actions at time t, and the outputs include vehicle canister purge flow predictions at time t+t1.

In various embodiments, the disclosed methods, systems, and vehicles provide for a canonical representation of the output of a hybrid recurrent neural network, along with the use of a deep neural network to regress over this canonical representation and to predict vehicle actions (e.g., purge flow actions) for a vehicle using multiple neural networks, as described above.

As mentioned briefly, the various modules and systems described above may be implemented as one or more machine learning models that undergo supervised, unsupervised, semi-supervised, or reinforcement learning. Such models might be trained to perform classification (e.g., binary or multiclass classification), regression, clustering, dimensionality reduction, and/or such tasks. Examples of such models include, without limitation, artificial neural networks (ANN) (such as a recurrent neural network (RNN) and convolutional neural network (CNN)), decision tree models (such as classification and regression trees (CART)), ensemble learning models (such as boosting, bootstrapped aggregation, gradient boosting machines, and random forests), Bayesian network models (e.g., naive Bayes), principal component analysis (PCA), support vector machines (SVM), clustering models (such as K-nearest-neighbor, K-means, expectation-maximization, hierarchical clustering, etc.), and linear discriminant analysis models.

While at least one exemplary embodiment has been presented in the foregoing detailed description, it should be appreciated that a vast number of variations exist. It should also be appreciated that the exemplary embodiment or exemplary embodiments are only examples and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for operating canister purge comprising:
    obtaining a set of inputs, by a processor, pertaining to one or more features used to predict purge vapor characteristics of an intake system of a vehicle;
    obtaining data, by the processor, from sensors about a vehicle's intake system for use by a neural network to enable the processor to classify the set of inputs comprising the one or more features for a purge flow control for use in predicting a presence of purge content in the vehicle's intake system, wherein the neural network comprises a convolution neural network (CNN) for classifying, by the processor, the set of inputs to predict the purge content in the vehicle's intake system;
    obtaining, by the processor, an output from the neural network wherein the output is configured as a binary output to instruct a vehicle controller to execute an action of an injector fueling command;
    applying, by the processor, a convolution function of a first, a second, and a third layer of the CNN to classify the set of inputs composed of the one or more features into one or more feature matrices with size reductions for configuring a fuel control action based on the binary output and
    applying, by the processor, a first dense function to vectorize a feature matrix received from an output from the third layer wherein a first dense function flattens the feature matrix into a single connected vector for configuring the fuel control action based on the binary output.

2. The method of claim 1, further comprising:
applying, by the processor, a second dense function to determine a resultant binary output based on the single connected vector received from the first dense function wherein the resultant binary output is either an ON flag or an OFF flag to indicate purge vapor existence in the intake system.

3. The method of claim 1, wherein the neural network comprises a hybrid deep CNN with a recurrent neural network (RNN) for applying, by the processor, a gating action at a previous time (t−1) to a current time (t) of a difference of passing data to reduce the set of inputs for predicting purge flow of the vehicle's intake system.

4. The method of claim 3, wherein:
executing, by the processor, a set of Long Short-Term Memory (LTSM) gates in a first and a second layer of the RNN wherein each LSTM gate is a forget gate in a sigmoid layer that executes a function passing on data in a forward propagation of an input at the previous time (t−1) to an output at the current time (t) wherein a difference between a previous input (t−1) and a current input (t) reduces an input feature set to configure a fueling control action by a binary or continuous output.

5. A system comprising:
a set of inputs obtained by a processor that pertain to one or more features used to predict purge vapor characteristics in an intake system of a vehicle;
a set of sensors to sense data about a vehicle's intake system to send to the processor for use in a neural network to enable the processor to classify the set of inputs comprising the one or more features for prediction of purge flow control by predictions of a presence of purge content in the vehicle's intake system; and
an output from the neural network obtained by the processor wherein the output is configured as a binary or continuous output to instruct a vehicle controller comprising a fuel controller to execute an action of injector fueling control comprising:
in response to an output configured as a binary model, the fuel controller utilizes a binary output based on the binary model to apply a different compensation logic using a plurality of gain sets and control strategies for accounting for characteristics of the intake system based on whether purge vapor is present or not in the intake system; and
in response to an output configured in a continuous model, the fuel controller adjusts, based on the continuous model for one or more disturbances caused by fluctuations of purge vapor concentration in the intake system, by a proactive prediction of a drop of purge vapor concentration and an instructing of an action of an injector fueling control based on the proactive purgep prediction to increase an amount of fueling to an engine of the vehicle thereby avoiding occurrence by the engine of a lean combustion condition.

6. The system of claim 5, further comprising:
in response to the output configured in the continuous model, the fuel controller adjusts, based on the continuous model for the one or more disturbances caused by fluctuations of the purge vapor concentration in the intake system, by the proactive prediction of an increase in the purge vapor concentration, and instructing of the action of the injector fueling control based on the proactive prediction to decrease the amount of fueling to the engine of the vehicle thereby avoiding occurrence by the engine of a rich combustion condition.

7. The system of claim 6 wherein the continuous model generates the continuous output with a value between zero and one that represents the purge vapor concentration in the intake system wherein a zero value represents no presences of hydrocarbon content in the intake system, and one value represents a fully saturated hydrocarbon content in the intake system.

8. The system of claim 7, wherein the neural network comprises a convolution neural network (CNN), to classify the set of inputs for predicting purge flow of the vehicle's intake system.

9. The system of claim 8, further comprising:
a first, a second, and a third layer of the CNN, each comprising a convolution function for classifying the set of inputs by convoluting actions of the one or more features into one or more feature matrices with size reductions to generate the binary output to configure a fueling control action.

10. The system of claim 9, further comprising:
a first dense layer to receive an output from the third layer of the CNN wherein the first dense layer comprises a first dense function which the processor executes to vectorize a feature matrix received from the output from the third layer wherein a first dense function flattens the feature matrix into a single connected vector to configure a fuel control action by the binary output.

11. The system of claim 10, further comprising:
a second dense layer to receive an output from the first dense layer, wherein the second dense layer comprises a second dense function which the processor executes to determine a resultant binary output based on the single connected vector generated by the first dense function wherein the resultant binary output is either an ON flag or an OFF flag to indicate purge vapor existence in the intake system.

12. The system of claim 6, further comprising:
the neural network comprising a hybrid deep CNN with a recurrent neural network (RNN) that is obtained by the processor in which the processor applies a gating action at a previous time (t−1) to a current time (t) of a difference of passing data to reduce the set of inputs to predict purge flow vapor characteristics of the vehicle's intake system.

13. The system of claim 11, wherein:
a set of Long Short-Term Memory (LSTM) gates is executed by the processor in a first and a second layer of the RNN wherein each LSTM gate is a forget gate in a sigmoid layer that, upon execution, enables passing of data in a forward propagation of an input at a previous time (t−1) to an output at a current time (t) wherein a difference of a previous input (t−1) and current input (t) reduces an input feature set to configure the fueling control action by the binary or continuous output.

14. A vehicle apparatus comprising:
an intake system coupled to a set of sensors generate sensed data about operations of the intake system;
a purge canister system contained in the intake system comprising a charcoal canister and a purge valve for allowing purge content from the charcoal canister in the intake system to enter into an engine; and a vehicle controller comprising a processor wherein the processor is coupled to a neural network and configured to:
obtain a set of inputs that pertain to one or more features used to predict purge vapor characteristics in an engine intake system;
obtain the sensed data for use by the neural network to enable the processor to classify the set of inputs that comprise the one or more features for purge flow control for use to predict a presence of purge content in a vehicle intake system;
obtain an output from the neural network wherein the output is configured as a binary output to instruct the vehicle controller to execute an action to control the purge content by opening the purge valve to move the purge content comprising fuel vapor contained in the charcoal canister into the engine;
apply a first dense function to vectorize a feature matrix received from an output from a third layer wherein a first dense function flattens the feature matrix into a single connected vector to configure a fuel control action based on the binary output
apply a second dense function to determine a resultant binary output based on the single connected vector received from the first dense function wherein the resultant binary output is either an ON action or an OFF action to predict the purge canister system;
implement the neural network which comprises: a hybrid deep CNN with a recurrent neural network (RNN) that applies a gating action at a previous time (t−1) to a current time (t) of a difference of passing data to reduce the set of inputs for controlling purge flow of the vehicle intake system; and
execute a set of Long Short-Term Memory (LTSM) gates in a first and a second layer of the RNN wherein each LSTM gate is a forget gate in a sigmoid layer that executes a function passing on data in a forward propagation of an input at the previous time (t−1) to an output at the current time (t) wherein a difference a previous input (t−1) and current input (t) reduces an input feature set for configuring the fuel control action by a binary or continuous output.

15. The vehicle apparatus of claim 14, further comprising: the processor configured to:
implement the neural network to classify the set of inputs to predict the purge flow of the vehicle intake system.

16. The vehicle apparatus of claim 15, further comprising: the processor configured to:
apply a convolution function of a first, a second, and the third layer of the CNN to classify the set of inputs composed of the one or more features into one or more feature matrices with size reductions for configuring a fueling control action based on the binary or continuous output.

* * * * *